(12) United States Patent
Raman

(10) Patent No.: US 9,014,156 B2
(45) Date of Patent: *Apr. 21, 2015

(54) TRAFFIC FORWARDING IN MESH NETWORKS

(75) Inventor: Gopalakrishnan Raman, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 839 days.

This patent is subject to a terminal disclaimer.

(21) Appl. No.: 12/565,490

(22) Filed: Sep. 23, 2009

(65) Prior Publication Data

US 2011/0069686 A1    Mar. 24, 2011

(51) Int. Cl.
*H04W 4/00* (2009.01)
*H04L 12/413* (2006.01)
*H04L 12/753* (2013.01)

(52) U.S. Cl.
CPC .............. *H04L 12/413* (2013.01); *H04L 45/48* (2013.01)

(58) Field of Classification Search
None
See application file for complete search history.

(56) References Cited

U.S. PATENT DOCUMENTS

| 7,742,455 | B2* | 6/2010 | Hosein et al. ................. 370/338 |
| 7,978,725 | B2 | 7/2011 | Gong et al. |
| 2007/0110092 | A1 | 5/2007 | Kangude |
| 2007/0140245 | A1* | 6/2007 | Anjum et al. ................. 370/390 |
| 2007/0206547 | A1* | 9/2007 | Gong et al. ................... 370/338 |
| 2009/0201899 | A1* | 8/2009 | Liu et al. ....................... 370/338 |
| 2010/0014460 | A1 | 1/2010 | Shin et al. |
| 2011/0051699 | A1 | 3/2011 | Ramn |

OTHER PUBLICATIONS

U.S. Appl. No. 12/547,042, filed May 25, 2009, Office Action dated Oct. 14, 2011.
U.S. Appl. No. 12/547,042, filed May 25, 2009, Office Action dated Feb. 14, 2012.

* cited by examiner

*Primary Examiner* — Ian N Moore
*Assistant Examiner* — Brian T Le
(74) *Attorney, Agent, or Firm* — Ying Wang

(57) ABSTRACT

Prioritizing traffic forwarding in a wireless mesh network. In a wireless mesh network using carrier detect multiple access—collision avoidance with backoff, such as mesh networks supporting IEEE 802.11 clients, access points in the mesh calculate a node rank based on downstream and upstream rank components. Access points in the mesh then generate backoff times inversely proportional to their node rank. This has the effect of prioritizing traffic at nodes that have higher rank. The downstream and upstream rank components take into account the amount of space occupied by downstream and upstream traffic, respectively, and are weighted by their position in the mesh tree.

14 Claims, 1 Drawing Sheet

TRAFFIC FORWARDING IN MESH NETWORKS

CROSS REFERENCE TO RELATED APPLICATIONS

The present application is related to U.S. patent application Ser. No. 12/547,042 filed Aug. 25, 2009, incorporated herein by reference.

BACKGROUND OF THE INVENTION

The present invention relates to wireless digital networks, and in particular, to the problem of traffic forwarding in mesh networks.

Wireless digital networks commonly have a controller to which are attached one or more access points. Each access point supports a number of wireless clients. In most situations, each access point connects to its controller using a wired connection. Such wired connections, for example using 803.2 Ethernet and often 802.3af power over Ethernet, provide a high capacity channel between controller and access points.

In some situations, however, it is not possible to provide wired data connections to access points. Examples include large outdoor installations, such as rail yards, cargo terminals, and large college campuses. In such situations mesh networks are used. In a mesh network, only a few, perhaps only one access point has a wired connection to a controller. This access point may be referred to as a portal, or a root node. All other access points in the mesh network communicate wirelessly, access point to access point. Access points are organized into a mesh, a network usually represented topologically as a tree with its origin, or root, the access point with the wired connection to the controller.

In the operation of a mesh network, traffic from a client connected to an access point passes through the mesh in a directed fashion from access point to access point until the traffic finally reaches the root node. Similarly, traffic flows through the root node, and through a succession of access points until it reaches the access point to which the client is attached.

For various engineering reasons, mesh networks typically operate using a single radio channel for transferring data within the mesh, that is, from access point to access point. In many installations, this same channel may also be used in communicating between the access point and the wireless client.

The use of the shared channel leads to a problem where some mesh access points obtain a larger portion of the channel capacity for their transmissions compared to some other mesh access points that get a smaller portion. This imbalance causes data packets to accumulate at certain mesh access points eventually leading to data loss. To characterize the problem further, we need to consider both directions in which traffic flows through the mesh network—"downstream" from the portal (or root) towards the edge of the network, and "upstream" from the edge of the network towards the portal. To illustrate how the imbalance can affect downstream traffic, FIG. 1 shows a mesh network in which access point 200 is the root node of the mesh, access points 201 through 207 are mesh nodes, and 300 through 303 are wireless clients attached to nodes in the mesh.

Consider mesh access point 206. If parent node 205 has a steady stream of data destined to client node 302 and succeeds in getting access to the channel whenever it has data to send, then data packets will accumulate at 206 since 206 does not get a chance to forward the data downstream to client 302. In the upstream direction, the tree structure of the mesh causes a problem when traffic flows from multiple wireless clients up to the portal or root node. If an upstream node such as 205 does not get timely access to the channel for its transmissions, the memory capacity of that access point will be exceeded, and packets comprising the traffic must be dropped.

What is needed is a way of prioritizing traffic within access points in the mesh in both the upstream and downstream directions.

BRIEF DESCRIPTION OF THE DRAWINGS

The invention may be best understood by referring to the following description and accompanying drawings that are used to illustrate embodiments of the invention in which.

DETAILED DESCRIPTION

Figure 1:
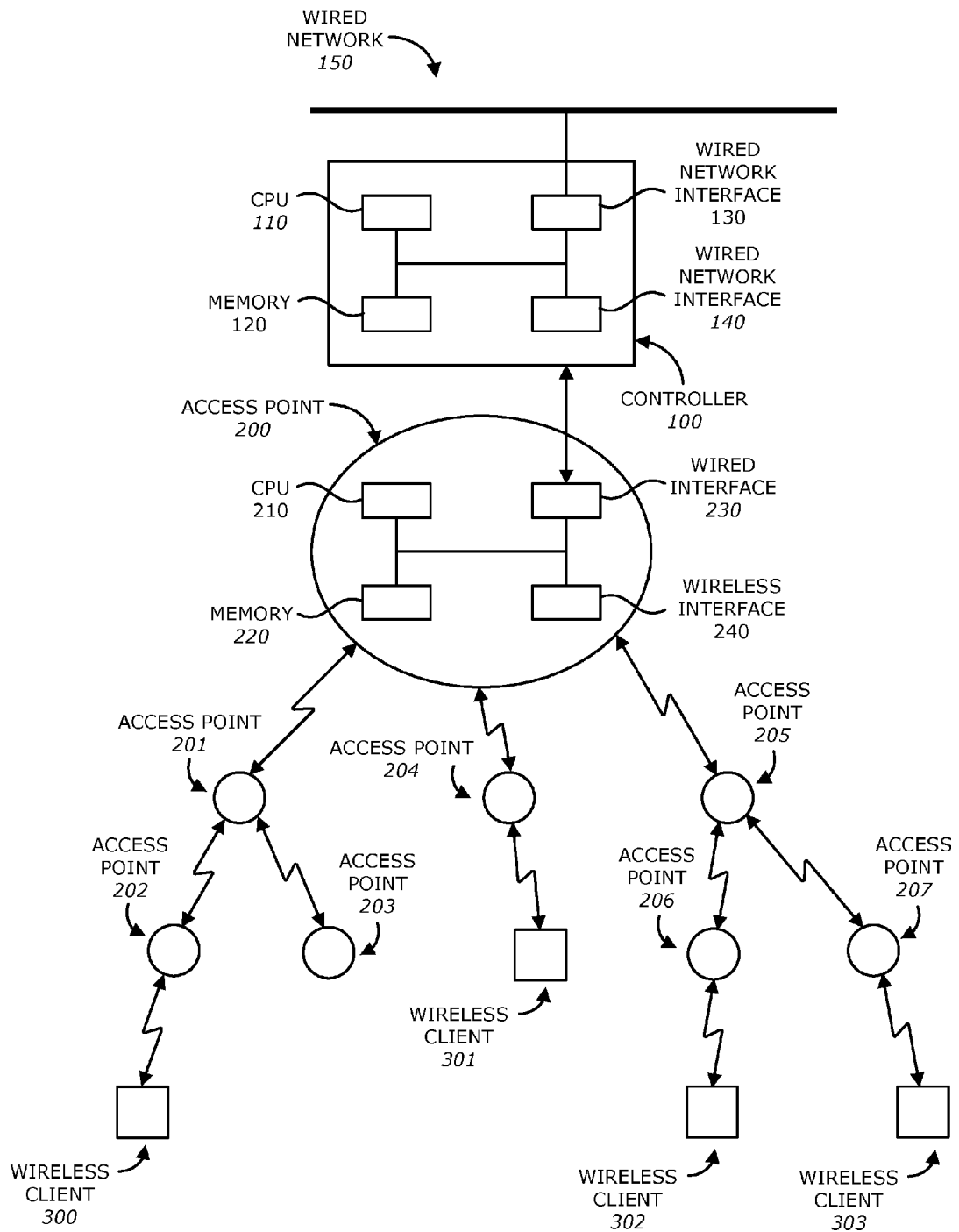
FIG. 1 shows a mesh network.

Embodiments of the invention relate to methods of prioritizing traffic flow in a wireless mesh network. In an embodiment of the invention for wireless networks practicing carrier sense multiple access collision avoidance (CSMA/CA) with backoff, such as IEEE 802.11 wireless networks, access points in a mesh network are represented in a tree topology with the root or portal node as level 0 of the tree, and each successive level of access points having a level of one plus the level of the access point to which they connect. Wireless traffic is prioritized by having access points use a backoff time that depends on several factors such as the number of packets waiting in the upstream and downstream queues, the number of hops these packets have traversed, and the level or distance of the mesh node to the root or portal node.

CSMA/CA with exponential backoff is specified as part of the IEEE 802.11 standard, IEEE-Std 802.11-1999 (R2003) incorporated herein by reference, and is practiced by devices operating in accordance with the standard.

FIG. 1 shows a mesh network in which controller 100 connected to wired network 150 supports a plurality of access points forming a mesh network. A wired connection is provided between controller 100 and access point 200, the root node of the mesh. Access points 201, 202, 203, 204, 205, 206, 207 operate as mesh nodes and connect wirelessly as shown to root 200. Client devices 300, 301, 302, 303 connect wirelessly through the mesh.

As shown in FIG. 1, client 300 connects wirelessly to access point 202 which in turn connects wirelessly to access point 201 which in turn connects wirelessly to access point 200, the root of the mesh.

Controller 100 is a purpose-built digital device having a CPU 110, memory hierarchy 120, and a plurality of network interfaces 130. CPU 110 may be a MIPS-class processor from companies such as Raza Microelectronics or Cavium Networks, although CPUs from companies such as Intel, AMD, IBM, Freescale, or the like may also be used. Memory hierarchy 120 includes read-only memory for device startup and initialization, high-speed read-write memory such as DRAM for containing programs and data during operation, and bulk memory such as hard disk or compact flash for permanent file storage of programs and data. Wired network interfaces 130 and 140 are typically IEEE 802.3 Ethernet interfaces to copper, although high-speed optical fiber interfaces may also be used. Controller 100 typically operates under the control of purpose-built embedded software, typically running under a Linux operating system, or an operating system for embedded devices such as VXWorks. Controller 100 may have dedicated hardware for encryption, and/or for routing packets between network interfaces. Memory hierarchy 120 may also contain a Trusted Platform Module (TPM), an industry-standard device for providing secure storage.

Access points 200-207 are also a purpose-built digital devices having a CPU 210, memory hierarchy 220, a first wired interface 230, and wireless interface 240. As with controller 100, the CPU commonly used for such access nodes is a MIPS-class CPU such as one from Raza Microelectronics or Cavium Networks, although processors from other vendors such as Intel, AMD, Freescale, and IBM may be used. Memory hierarchy 220 comprises read-only storage such as ROM or EEPROM for device startup and initialization, fast read-write storage such as DRAM for holding operating programs and data, and permanent bulk file storage such as compact flash memory. Memory hierarchy 220 may also contain a TPM. Remote access points 200-207 typically operate under control of purpose-built programs running on an embedded operating system such as Linux or VXWorks. Wireless interface 240 is typically an interface operating to the family of IEEE 802.11 standards including but not limited to 802.11a, b, g, and/or n.

Many wireless digital networks, such as IEEE 802.11 wireless networks practice carrier sense multiple access with collision avoidance (CSMA/CA) as a method of sharing a common channel among multiple devices. In CSMA/CA schemes, a device listens on the channel prior to transmitting, waiting for the channel to be idle. If the channel is busy, the device waits, or backs off, a predetermined period of time before checking again. When the channel is sensed as idle, the device also waits, or backs off, a predetermined period of time before transmitting. According to the IEEE 802.11 standard, this backoff time is random, and increases exponentially with subsequent attempts. This backoff process seeks to avoid collisions.

According to the present invention, access points in a mesh network calculate a backoff time using a formula or algorithm based on their current state in such a way that a node that is a more deserving candidate to transmit computes a smaller backoff time compared to a node that is less deserving. A node is considered more deserving if by transmitting it reduces the probability of data loss due to queue overflow in the network. The algorithm can be described as follows:

Node Rank Calculation: Each node gets a rank from 1 through N where N is a positive integer. The higher the rank of a node, the more deserving it is which translates to a smaller backoff time.

Downstream and Upstream Rank Components: If a node has data to transmit downstream, it calculates a downstream rank. If a node has data to transmit upstream it calculates an upstream rank. The sum of the two ranks is the overall rank of the node. The sum of the two ranks cannot exceed N. In the description below the downstream and upstream ranks are limited to N/2 which represents an equal weighting for downstream and upstream traffic. However other weightings are possible.

DEFINITIONS

CurrentMaxHops: This is the maximum hopcount among all packets in the downstream transmit queue of the node. The hopcount of a packet is the number of hops it has already traversed to arrive at this node.

MaxTreeHops: This is the maximum number of levels in the tree (root has level of 0).

DownstreamBufferRatio: If 'MaxDownstreamBufferAllocation' is the amount of buffer space allocated for downstream packets, and 'CurrentDownstreamBufferUsage' is the space occupied by downstream packets, then the ratio CurrentDownstreamBufferUsage/MaxDownstreamBufferAllocation is the 'DownstreamBufferRatio' (it is a number between 0 and 1)

NodeLevelRatio: We refer to the level of a node in the tree as 'NodeLevel' and we define the 'NodeLevelRatio' as (1−NodeLevel/MaxTreeHops). Nodes closer to the root will have a higher value.

UpstreamBufferRatio: This is similar to DownstreamBufferRatio defined earlier except it refers to space occupied by packets destined upstream.

Downstream Rank: This is the sum HopRank+BufferRank where HopRank is defined as (CurrentMaxHops/MaxTreeHops)*N/4 and BufferRank is defined as Downstream BufferRatio*(N/4)

Upstream Rank: This is the sum LevelRank+BufferRank where LevelRank=NodeLevelRatio*(N/4) and BufferRank=Upstream BufferRatio*(N/4)

TotalNodeRank: This is the sum UpstreamRank+DownstreamRank

What the above algorithm seeks to achieve is that the rank of nodes dynamically adjusts to ensure that traffic keeps moving through the mesh without accumulating at any node. For example, as traffic moves downstream through the mesh, its priority increases at each hop since its HopRank increases. This ensures that traffic already in transit through the mesh is "drained out" before the mesh accepts new traffic from the wired side. Likewise, as upstream traffic gets closer to the root of the tree, the LevelRank increases and it "bubbles up" faster to the root.

Finally, we map the rank to a backoff delay. A higher rank translates to a smaller backoff delay. If the value N is less than the maximum delay M that standard 802.11 devices use, then the backoff delay can simply be chosen as (M−N). Other ways of mapping the rank are possible as long as a higher rank translates to a smaller delay.

Note that the shortened periods that the algorithm calculates are shorter than those practiced by devices practicing the 802.11 standard. This has the effect of placing a higher priority on traffic being transmitted by mesh access nodes.

The level of a node in the tree may be calculated in a number of ways known to the art. In one embodiment, access points forming the mesh are enumerated by walking the tree formed by the mesh. This process may be incorporated into the process of organizing nodes into the mesh, or reorganizing nodes in the mesh when the mesh topology changes. Walking or coloring the tree, as is known to the art, assigns levels to the access points, with the root or portal being level 0, the access points connecting to the root are level 1, and so on. Depth first searches and breadth first searches are approaches to walking the tree and assigning levels. As an example the numbering of access points 201 through 207 in FIG. 1 are the result of a depth-first search. A similar protocol header field in each packet can be used to calculate the number of hops a packet has traversed which is used in the calculation of CurrentMaxHops.

In another embodiment, nodes in the mesh use a dedicated field in a protocol header to count how many hops a packet takes through the mesh, The header could be the mesh header as described in IEEE-80211s/D2.0 Part 11 or it could be a higher level protocol header such as TCP/IP. The header field is incremented each time a node forwards a packet. In such an embodiment, a node may determine its level in the mesh by examining this field in packets coming from root node 200.

Once levels have been assigned to access points in the mesh, this level is used as the distance to the root.

Examining FIG. 1, all traffic to and from client devices 302 and 303 must pass through access point 205. When client 302 wishes to send a packet to a service on network 150, it transmits that packet to access point 206 on the mesh. Access point 206 then transmits the packet to access point 205 on the mesh, which sends it to access point 200.

If client devices 302 and 303 are generating substantial amounts of upstream traffic, access point 205 is going to be very busy. While it is common for access points to incorporate queues for holding data to be transmitted, particularly in a mesh environment, it is easy for those queues to be filled.

According to the 802.11 standard, when the shared radio channel used by mesh nodes 200-207 goes idle, stations wishing to transmit wait a randomized period of time with exponential backoff according to the algorithm specified in the standard. At the end of that interval, if the channel is still idle, the station begins transmitting. This insures fairness.

According to the present invention, access points in the mesh calculate their wait and backoff times using the rank calculation algorithm described above and do so in a manner which results in shorter times than those specified in the standard.

According to the present invention, if both access points 205 and 206 have traffic to transmit upstream, when the shared channel goes idle, access point 205 at level 1 of the mesh will generate a wait time that is less than the wait time generated by access point 206 which is at level 2 of the mesh. Similarly, access point 206 will generate a wait time for upstream traffic which is less than the wait time generated by client device 302. This has the effect, then, of prioritizing upstream traffic transmissions by access points closer to the root of the mesh. Similar arguments apply to the downstream traffic where nodes further away from the root calculate a higher rank and smaller backoff delay for transmissions directed downstream The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system comprising:
   a first device including a hardware processor;
   the system being configured to perform operations comprising:
   receiving, at the first device, a packet from a second device;
   determining a value representing a distance that the packet has travelled in a network prior to reaching the first device;
   based at least on the value representing the distance that the packet has travelled in the network prior to reaching the first device, generating a particular backoff time for use in requesting channel access for wireless transmission of the packet by the first device;
   requesting channel access using the particular backoff time that is based at least on the value representing the distance that the packet has travelled in the network prior to reaching the first device;
   subsequent to obtaining channel access: wirelessly transmitting the packet by the first device;
   wherein the value representing the distance that the packet has travelled in the network prior to reaching the first device is a number of hops taken by the packet or a number of nodes traversed by the packet,
   wherein the particular backoff time is inversely proportional to the distance that the packet has travelled in the network prior to reaching the first device.

2. The system of claim 1, wherein the network is a wireless mesh network and the first device is a mesh node in the wireless mesh network.

3. The system of claim 1, wherein the value is indicated in a header of the packet.

4. The system of claim 1, wherein the particular backoff time is further based on whether the packet is being transmitted toward a mesh portal connected to a wired network or away from the mesh portal.

5. The system of claim 1, wherein the particular backoff time is further based on a distance of the first device from a mesh portal connected to a wired network.

6. A non-transitory computer readable medium comprising instructions which, when executed by one or more hardware processors, causes performance of operations comprising:
   receiving, at a first device, a packet from a second device;
   determining a value representing a distance that the packet has travelled in a network prior to reaching the first device;
   based at least on the value representing the distance that the packet has travelled in the network prior to reaching the first device, generating a particular backoff time for use in requesting channel access for wireless transmission of the packet by the first device;
   requesting channel access using the particular backoff time that is based at least on the value representing the distance that the packet has travelled in the network prior to reaching the first device;
   subsequent to obtaining channel access: wirelessly transmitting the packet by the first device;
   wherein the value representing the distance that the packet has travelled in the network prior to reaching the first device is a number of hops taken by the packet or a number of nodes traversed by the packet,
   wherein the particular backoff time is inversely proportional to the distance that the packet has travelled in the network prior to reaching the first device.

7. The non-transitory computer readable medium of claim 6, wherein the network is a wireless mesh network and the first device is a mesh node in the wireless mesh network.

8. The non-transitory computer readable medium of claim 6, wherein the value is indicated in a header of the packet.

9. The non-transitory computer readable medium of claim 6, wherein the particular backoff time is further based on whether the packet is being transmitted toward a mesh portal connected to a wired network or away from the mesh portal.

10. The non-transitory computer readable medium of claim 6, wherein the particular backoff time is further based on a distance of the first device from a mesh portal connected to a wired network.

11. A method comprising:

receiving, at a first device including a hardware processor, a packet from a second device;

determining a value representing a distance that the packet has travelled in a network prior to reaching the first device;

based at least on the value representing the distance that the packet has travelled in the network prior to reaching the first device, generating a particular backoff time for use in requesting channel access for wireless transmission of the packet by the first device;

requesting channel access using the particular backoff time that is based at least on the value representing the distance that the packet has travelled in the network prior to reaching the first device;

subsequent to obtaining channel access: wirelessly transmitting the packet by the first device;

wherein the value representing the distance that the packet has travelled in the network prior to reaching the first device is a number of hops taken by the packet or a number of nodes traversed by the packet, wherein the particular backoff time is inversely proportional to the distance that the packet has travelled in the network prior to reaching the first device.

12. The method of claim 11, wherein the network is a wireless mesh network and the first device is a mesh node in the wireless mesh network.

13. The method of claim 11, wherein the value is indicated in a header of the packet.

14. The method of claim 11, wherein the particular backoff time is further based on (a) whether the packet is being transmitted toward a mesh portal connected to a wired network or away from the mesh portal and/or (b) a distance of the first device from a mesh portal connected to a wired network.

* * * * *